(12) United States Patent
Trimberger

(10) Patent No.: US 8,472,619 B1
(45) Date of Patent: Jun. 25, 2013

(54) MULTIPLE VALIDLY DECRYPTABLE MESSAGES

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 68 days.

(21) Appl. No.: 13/182,398

(22) Filed: Jul. 13, 2011

(51) Int. Cl.
*H04L 9/00* (2006.01)

(52) U.S. Cl.
USPC .......................................................... 380/28

(58) Field of Classification Search
None
See application file for complete search history.

(56) References Cited

U.S. PATENT DOCUMENTS 6,021,203 A * 2/2000 Douceur et al. .............. 380/252
2010/0077483 A1 * 3/2010 Stolfo et al. .................... 726/24

\* cited by examiner

*Primary Examiner* — Cordelia Zecher
(74) *Attorney, Agent, or Firm* — Joseph A. Sawyer, Jr.; W. Eric Webostad

(57) ABSTRACT

In one aspect, a method for providing encrypted information includes encrypting a true message to form an encrypted true message. A ciphertext message including the encrypted true message is formed, where multiple messages are decryptable from the ciphertext message. The messages include a true message including true information and at least one decoy message including false information.

17 Claims, 5 Drawing Sheets

MULTIPLE VALIDLY DECRYPTABLE MESSAGES

BACKGROUND

Encryption and decryption of information is used for hiding and/or securing information such that only intended recipients can access the information, and has a multitude of different uses and applications. In an encryption process, readable or otherwise accessible information (plaintext) is converted into unreadable encrypted information (ciphertext), and in the decryption process, the ciphertext is converted back into plaintext. One or more keys, known only to the sender and/or receiver of the information, are typically used in the encryption and decryption process as a security parameter governing the results of a particular encryption and decryption. Encryption is commonly used to protect information that is stored, communicated, or otherwise used on or between computer systems and electronic devices. In one example, some Field Programmable Gate Arrays (FPGAs) or other programmable devices can be configured using proprietary and confidential configuration data files, which can be encrypted for transmission to keep their contents secret and decrypted at the device to perform configuration tasks on the device. In another example, a smart card can encrypt and decrypt identity and other personal data of a user which can be used in commercial or other transactions.

There are many different methods which attackers can use to attempt to gain unauthorized access to encrypted information. Some encryption and decryption methods are vulnerable to what are known as "side channel attacks." These attacks are based on information gained from exploiting the physical implementation of a cryptosystem, rather than through brute force, mathematical or other theoretical weaknesses in the encryption methods themselves. For example, a timing attack can observe data movement into and out of a CPU or memory, determine how long it takes to perform cryptographic operations by the CPU, and using statistical analysis of timing measurements, determine the entire secret key. A power analysis attack such as simple power analysis (SPA) and differential power analysis (DPA) can be used to determine a secret key by using statistical guesswork on observations of the power consumption of a hardware device such as a CPU, Field Programmable Gate Array (FPGA), or other device. Other trial-and-error methods can also be used to attempt to determine the content of an encrypted message. Some countermeasures to these attacks can be taken, but may not be sufficient to adequately protect secret information.

Accordingly, apparatus and methods that can delay or mislead attackers of encrypted information without significantly increasing the complexity of encryption would be desirable in many applications.

SUMMARY

In one aspect, a method is disclosed for providing encrypted information, including encrypting a true message to form an encrypted true message. The processor is used to form a ciphertext message including the encrypted true message, where multiple messages are decryptable from the ciphertext message. The messages include a true message including true information and at least one decoy message including false information.

Various implementations can include additional features. Each of the messages can be decryptable using a different key. A true key can be used in the forming of the encrypted true message. At least one encrypted decoy message can be formed from the at least one decoy message and at least one decoy key, and included in the ciphertext message. The ciphertext message can include intermingled portions of encrypted true message and encrypted decoy messages, such as intermingled blocks of information. A true message indicator can be associated with the ciphertext message, indicating which of the messages is the true message. This indicator can be combined with the true key in some embodiments. The true message indicator can indicate a position of the true message in the ciphertext message, or can include at least one embedded characteristic of the true message and authentic information, such that the true message is indicated by matching the at least one embedded characteristic of one of the messages to the authentic information, such as the result of a hash or integrity check. The ciphertext message can include at least one pattern of information, where the true message indicator indicates whether or not a result of an operation between decrypted information derived from the encrypted true message and the at least one pattern is the true message. The ciphertext message can include multiple correction patterns of information, where the true message indicator indicates which of the correction patterns is to be used to operate on decrypted information derived from the encrypted true message to obtain the true message. A system can implement similar features.

In another aspect, a method is disclosed for decrypting information, including receiving a ciphertext message including encrypted information. The method can further include decrypting, using a processor, the encrypted information to obtain multiple messages from the ciphertext message, the messages including a true message including true information and at least one decoy message including false information. The true message is selected as decrypted information.

Various implementations can include additional features. Decrypting the encrypted information can include decrypting an encrypted true message included in the ciphertext message using a true key, and decrypting at least one encrypted decoy message included in the ciphertext message using at least one decoy key. Decrypting can include using a true message indicator to process the decrypted information with at least one correction pattern included in the ciphertext message to derive the true message and the at least one decoy message. The ciphertext message can include an encrypted true message and decoy information. Selecting the true message can include using a true message indicator associated with the ciphertext message. The true message indicator can indicate a position of the true message in the ciphertext message. The true message indicator can include at least one embedded characteristic of the true message and authentic information such that the true message is indicated by matching the characteristic of a message to the authentic information.

In yet another aspect, a non-transitory computer-readable medium having instructions which when executed on a computer perform a method that includes decrypting the encrypted information to obtain multiple messages from the ciphertext message, where the messages include a true message including true information and at least one decoy message including false information. The method can further include selecting the true message as decrypted information.

DETAILED DESCRIPTION

One or more embodiments relate generally to encryption and/or decryption of information, and more specifically to encryption and/or decryption including multiple validly decryptable messages. The following description is presented to enable one of ordinary skill in the art to make and use these embodiments, and is provided in the context of a patent application and its requirements. Various modifications to the disclosed embodiments and the generic principles and features described herein will be readily apparent to those skilled in the art. Thus, the disclosed embodiments are to be accorded the widest scope consistent with the principles and features described herein.

One or more embodiments described herein include methods and systems allowing multiple valid decryptions of encrypted information. Some of the valid decryptions can be decoy messages which include false information and do not include true, secret information. This causes adversaries who illegally discover a decryption key to potentially recover the false information instead of the true information.

To more particularly describe the features of the disclosed embodiments, please refer to FIGS. 1-5 in conjunction with the discussion below.

Figure 1:
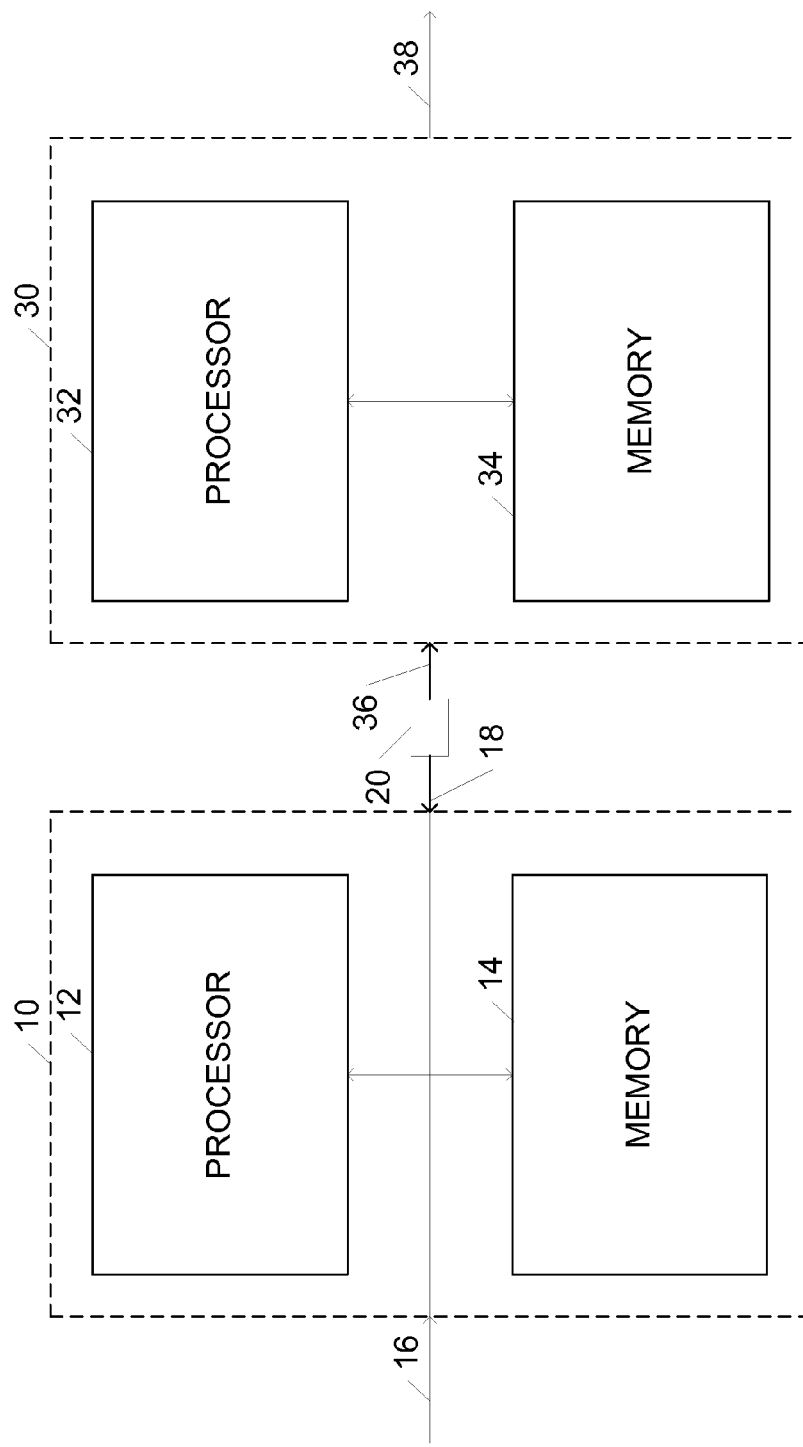
FIG. 1 is a block diagram of one embodiment of a processing system.

FIG. 1 is a block diagram of one embodiment of a processing system 10. The processing system 10 can be any electronic device, computer system, subsystem for a device or computer, or similar apparatus, and can include software or firmware as well as hardware. Processing system 10 can include a processor 12 and a memory 14. Processor 12 can be or include any processing circuit that can perform desired functions and calculations for the processor system 10, such as one or more microprocessors, CPUs, programmable devices or circuits, logic gates, etc. Memory 14 is a storage device coupled to the processor 12 and is typically provided to store information such as instructions and/or data that is read and/or written by processor 12 and other components of the system 10, and can include RAM, ROM, EEPROM, Flash, or other type of memory. Memory 14 can be internal memory on the same integrated circuit or package as processor 12, and/or can be external memory coupled to processor 12 on a bus or other connection. Other well-known components can also be provided in processing system 10, such as other storage devices (magnetic disk, optical disk or other storage medium, etc.), input devices, display or other output devices, etc.

In some embodiments, the system 10 is in communication with another processing system 30 over a communication link 20, such as a network, wired or wireless connection, etc. System 30 can include a processor 32 and a memory 34 similar to these components described for system 10. The processing system 30 can be any electronic device, computer system, subsystem for a device or computer, or similar apparatus, as described above for system 10.

The systems 10 and 30, and/or one or more different systems, may encrypt and/or decrypt messages as described herein. In some embodiments, the processing system 10 is used for encrypting information to form a ciphertext message. The processing system 10 receives at input 16 original true information (true message) to be encrypted, and may also receive decoy information (decoy message(s)) to include in the ciphertext message. Processor 12 encrypts and/or otherwise processes the information to form the ciphertext message. One or more keys which can be used in the encryption and/or decryption may be retrieved from memory 14 or other connected storage device. The ciphertext message can be stored in memory 14 or other storage device, and/or can be transmitted to a recipient, e.g. using output 18.

In some embodiments, the processing system 10 and/or system 30 can be used for decrypting a ciphertext message encrypted and formed as described in the embodiments herein. For example, in some embodiments, a ciphertext message encrypted by system 10 can be received by authorized system 30 over a transmission channel 20 and at input 36 of system 30. One or more decryption keys, including a true key for decrypting the true message, are received at input 36 as well, or can be provided via other inputs to processor 32 or are already accessible to the processor 32 in memory 34 or other connected storage device. The received ciphertext message is decrypted by processor 32 and the obtained true message is selected from the resulting multiple decrypted messages and utilized as desired in system 30 and/or provided on an output 38.

For example, in some embodiments the system 30 can include processor 32 as a CPU or microprocessor, a Field Programmable Gate Array (FPGA), a programmable Application-Specific Integrated Circuit (ASIC), or other programmable device, processing circuit, or other type of circuit or device. The processor 32 can receive input information from input 36 which can be encrypted information. In some embodiments, the processor 32 can access the appropriate key(s) for the encryption (e.g., from memory 34, registers, or other storage device) as well as procedures for implementing the decryption method corresponding to the encryption, and decrypt the information using the decryption method such that the information can be used by the system 30.

In one example, processor 32 is a programmable device such as a Field Programmable Gate Array (FPGA) that receives a ciphertext message including configuration data used for configuring and programming the functionality of the FPGA. This configuration data can be encrypted (e.g., by a different system 10 or device, or by a different component of system 10) to prevent unauthorized access and knowledge of the functionality of the FPGA. As it is receiving the encrypted configuration data, and/or after the data has been received, the FPGA decrypts the true message and runs this decrypted (plaintext) information to implement actions that program the internal logic circuits of the FPGA. The encrypted configuration data can be transmitted or provided from a variety of sources, such as memory 34 or other memory in the system 10, or from an external source such as a storage device, device on a communication network, etc. In some embodiments, an FPGA configuration circuit can be coupled to the processor 32 and used to configure the FPGA by loading encrypted configuration data stored in a designated memory into the FPGA during power-up or under other conditions. In other embodiments, the decryption can be performed by one processor 32 which then provides the decrypted data to an FPGA as a different processor.

Other embodiments can provide an FPGA or ASIC as processor 12 and/or 32 and receive and process other types of information as encrypted information, or a CPU or other processor in a computer system to perform encryption and/or decryption of received, transmitted, or stored information.

In another example, processor 12 and/or 32 is located in a portable secure data storage device 10 and/or 30, such as an identification device (e.g., a smart card or key fob having memory, magnetic storage, or other storage). The identification devices stores personal data including identity data for one or more associated users. Other portable devices can also be used for storing such personal data, such as cell phones, personal digital assistants, laptop computers, tablet computers, GPS devices, or other portable devices. For example, the portable device may store personal data in memory 14 and send such data to readers or other devices when requested for authentication or identification in commercial or other transactions. The data sent by the portable device can be encrypted by processor 12 before transmission or storage, and/or the portable device can decrypt received encrypted data, if needed for processing or analysis.

Processing system 10 and/or 30 may be the subject of attacks by unauthorized persons, referred to as "adversaries" herein, attempting to gain access to secret true messages. One type of attack for some types of systems is a side-channel attack, such as a power analysis attack, which can use simple power analysis (SPA) or differential power analysis (DPA). A DPA attack, for example, can include measuring the power consumption of the processor 12 or 32 or system 10 or 30 during processing operations such as decryption. By statistically examining the power consumption of the processor 12 or 32 over one or more decrypting operations, the attacker may be able to break the encryption to determine a decryption key, and thus have access to encrypted information. Other similar types of side-channel attacks can include timing attacks that can observe data movement into and out of processor 12 and 32 or memory 14 and 34, determine how long it takes to perform cryptographic operations, and using statistical analysis of timing measurements to determine the entire secret key. Other kinds of side-channel attacks can include acoustic attacks, thermal imaging attacks, and electromagnetic analysis attacks.

One or more embodiments described herein provide multiple messages validly decryptable from a ciphertext message, such that any of the messages will appear to be the valid and legal result of decrypting the information, but only one of the messages is the true message. The other message(s) can be decoy messages, which include at least some false information and need not include any true information that is desired to be kept secret and protected. If all the decryptable messages are decrypted during the decryption process, the adversary does not know which message is the true message, and a security advantage is gained.

Figure 2:
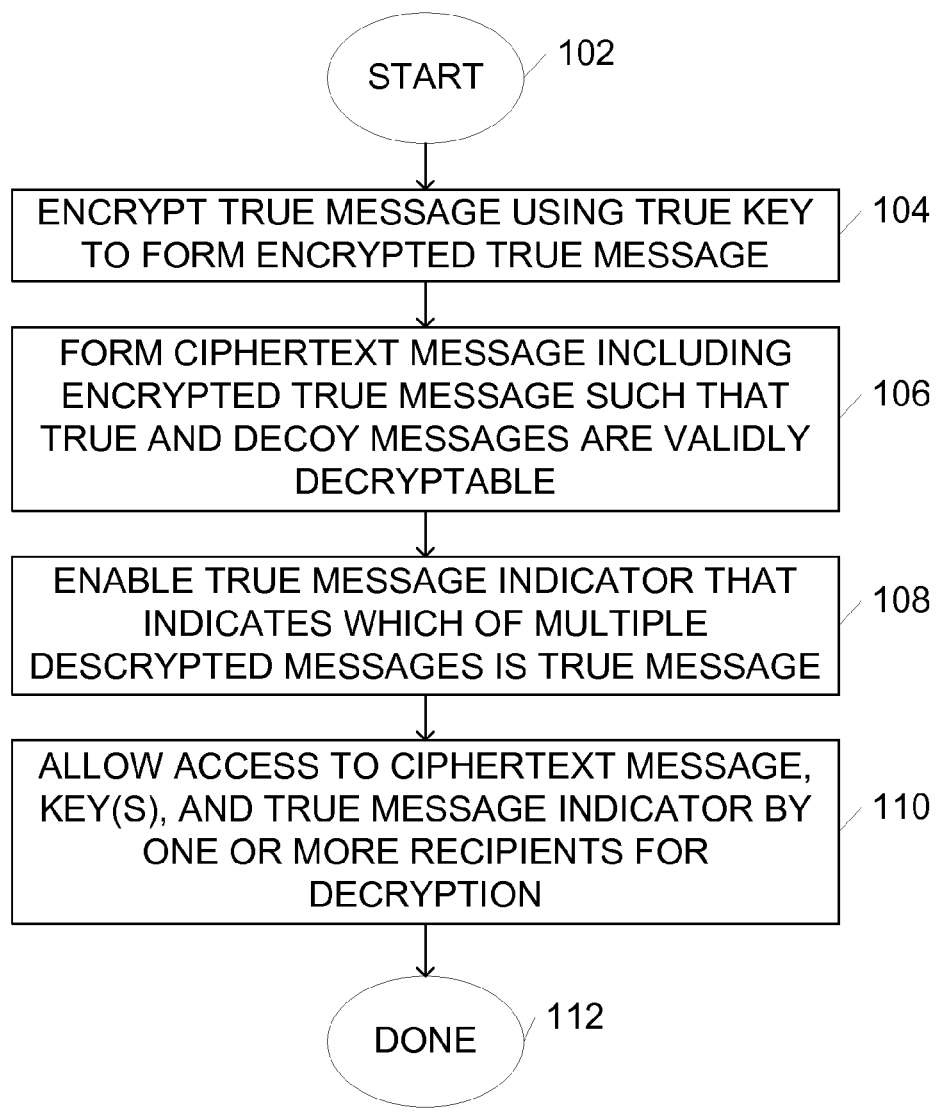
FIG. 2 is a flow diagram illustrating one embodiment of a method for providing encrypted information that includes multiple valid decryptable messages.

FIG. 2 is a flow diagram illustrating one embodiment 100 of a method for providing encrypted information that provides multiple valid decryptable messages. Method 100 can be implemented using a processor or processing circuit, a computer system or electronic device, or similar mechanism. For example, method 100 can be implemented using the system 10 or 30 of FIG. 1. The method 100 can be implemented in software, hardware, or a combination of both software and hardware. A software embodiment can include but is not limited to firmware, resident software, microcode, etc. executed by a processor or processing circuit. Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), flash memory, a rigid magnetic disk, an optical disk, and a solid-state memory drive. Current examples of optical disks include compact disk read only memory (CD-ROM), compact disk read/write (CD-R/W), DVD, and Blu-ray.

The method begins at 102, and in step 104, a true message is encrypted using a true key to form an encrypted true message. The (plaintext) true message is the original true information that is desired to be secured, and the true key is required to validly decrypt the encrypted true message to gain access to the plaintext true message. The encryption method used can be any suitable method; some examples of well-known encryption methods include DES (Data Encryption Standard), AES (Advanced Encryption Standard), RSA, RC4, RC5, RC6, Blowfish, etc. Some algorithms may facilitate decoy keys and messages. The true key specifies the particular transformation of the true message into the encrypted true message, and is kept secret to enable the true message to remain secure.

In step 106, a ciphertext message is formed including the encrypted true message, such that true and decoy messages are validly decryptable from the ciphertext message. The true message includes the true information that is desired to be protected. The decoy messages include at least some false information that is information not intended to be protected. For example, in some embodiments each decoy message includes only false information. In other embodiments, one or more of the decoy messages can each include some (typically less important) true information as well as false information, e.g., so that an adversary that decrypts a decoy message may be sufficiently deceived as to thinking he or she has found the true message, and may discontinue attacking the encrypted information.

In one example of encrypted information used to configure a programmable device such as an FPGA as described above, a decoy message can include information that works to functionally program a device, but does not program the device in the manner that the true message provides. The decoy message may be crafted to appear valid. The crafting of a decoy message may include, for example, a message that is English prose and has a decoy message adjusted so that the frequency of letters matches English usage. The crafting of a decoy message may include adjusting formatting so the decoy message appears to be a valid FPGA bitstream or valid video stream, correct CRC, parity or other data integrity codes, correct message authentication codes or digital signatures. Thus, an adversary who decrypts a decoy message for a programmable device and tests the decoy message on a programmable device may not find any obvious errors in the decrypted message or indications that it is a decoy, and may assume he or she has decrypted the true message, or may not know whether the decrypted information is a true message or a decoy message.

In some embodiments, the ciphertext message is formed by combining the encrypted true message with decoy information that allows the decoy message(s) to be decrypted from the ciphertext message in addition to the true message. The decoy information can take a number of different forms, many of which are described in the more-specific embodiments described below with respect to FIGS. 3 and 4. The combining of the encrypted true message with the decoy information can be implemented using different methods in different embodiments, many of which are also described in the embodiments of FIGS. 3 and 4. The combined result of the encrypted true message and decoy information is the ciphertext message, which can be provided or stored as encrypted information that provides barriers to its access without use of one or more keys and/or other information, as described below.

In step 108, a true message indicator can be formed or otherwise enabled, indicating which of multiple messages decryptable from the ciphertext is the true message. Each of the messages resulting from decryption of the ciphertext message appears valid or legal based on the decryption method, where one of the decrypted messages is the true message and the other messages are decoys. The true message indicator indicates to the decrypting process which of the multiple messages is the true message, or otherwise indicates how to obtain the true message from the ciphertext message. The true message indicator can be implemented in different ways depending on the embodiment, where some examples are described below with respect to FIGS. 3 and 4.

In step 110, access is allowed to the ciphertext, the true key, and the true message indicator by one or more recipients for decryption. For example, the ciphertext message can be stored on a storage device such as memory, disk drive, or other device, and accessed by one or more users or systems reading the storage device. Or the ciphertext message can be transmitted to another computer, device, or component to be accessed by a recipient device. Since it is encrypted, the ciphertext message can be made openly accessible in some embodiments, or be made secret in other embodiments.

Access by authorized recipients is also allowed for the true key and the true message indicator. Since this information indicates how to obtain the true message from the ciphertext message, they can be made secret and only accessible to intended recipients. In addition, methods can be used to ensure the authenticity of the true key and/or true message indicator. For example, authentication of the true key and message indicator using known methods such as certificates and certificate authorities can be used to ensure that the key and indicator are provided by an authorized source. As discussed below in various embodiments, the true message indicator can be transmitted in a variety of forms. For example, the true message indicator can be included with the true key, partially embedded in the ciphertext message, provided separately, provided with other information, included in a receiving system when manufactured, or otherwise provided; some of these embodiments are described in example embodiments of FIGS. 3 and 4.

The process is then complete at 112. It should be noted that the order of steps shown in FIG. 2 (or the step order any of the methods described herein) is only exemplary and is not necessary in other embodiments, and these steps can be performed in different orders where appropriate.

Figure 3:
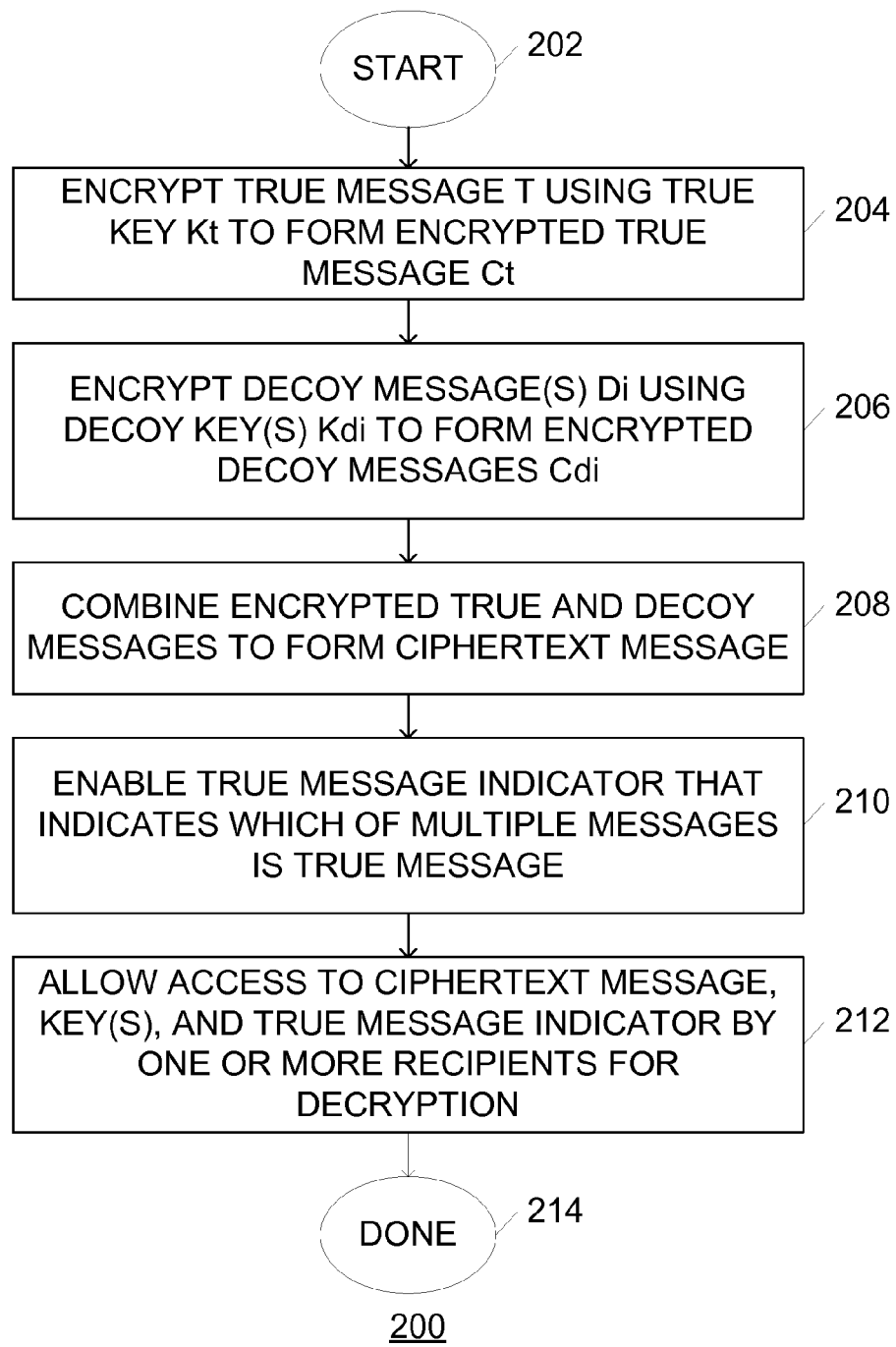
FIG. 3 is a flow diagram illustrating one example embodiment of the method of FIG. 2, in which decoy messages are included in the encrypted information.

FIG. 3 is a flow diagram illustrating one example embodiment 200 of a method for providing encrypted information that includes multiple validly decryptable messages, and in which decoy messages are included in the encrypted information. Method 200 describes particular embodiments of the method 100 of FIG. 2.

The method begins at 202, and in step 204, a true message T is encrypted using a true key $K_t$ to form an encrypted true message $C_t$. The (plaintext) true message T is the original information that is desired to be secured, and the true key is required to validly decrypt the encrypted true message to gain access to the plaintext true message. The encryption method used can be any suitable method as described with reference to FIG. 2.

In step 206, one or more decoy messages $D_i$ are encrypted using associated decoy keys $K_{di}$ to form encrypted decoy messages $C_{di}$ (where i=1 to n, where n>=1). In this embodiment, these decoy messages can be the decoy information included in the ciphertext message, as described in the example with reference to FIG. 2. The same type of encryption method used to encrypt the true message can be used to encrypt the decoy messages. The decoy keys are similar to the true key, where each decoy message can be encrypted with its own different associated decoy key. The decoy key is required to validly decrypt its associated encrypted decoy message to gain access to the plaintext decoy message. In general, the more decoy messages that are created, the greater the chance that an adversary finds a decoy message in an attack and not the true message. For example, one embodiment can encrypt three decoy messages, while another embodiment can encrypt 12 decoy messages. In yet another embodiment, the ciphertext message can include 2^128 decoy messages. The greater number of decoy messages, the more protection, but the greater amount of decrypting that is performed, which may increase processing time and resource requirements.

In some embodiments, the true key and the decoy keys can be related to each other. For example, one key can be the inverse of the other, or the keys can be bit rotations or other variations. Or the decoy keys can be specifically chosen to provide signatures similar to the true key when analyzed in a side-channel attack, such as causing a similar power consumption signature for a particular decrypting device. In one example, when using a byte-based encryption/decryption method (such as AES), an 8-bit rotation of the true key can be used for a decoy key, such that a similar power signature appears during decryption using the decoy key as when using the true key, but at a different time or bit position. Such key relatedness can allow in some embodiments the decoy keys to appear more like the true key in side-channel attack analysis and therefore may provide a greater chance to fool an adversary into accepting a decoy key as the true key. In some embodiments, there is less storage space needed to store a decoy key that is a transformation of a true key. However, in some embodiments, related keys may have a disadvantage in that a related true key may be easier for an adversary to discover after determining a decoy key.

In step 208, the encrypted true message is combined with the at least one encrypted decoy message to form a ciphertext message. The encrypted messages can be combined using different methods in different embodiments. For example, in one embodiment, the true message is concatenated with the decoy messages such that all the encrypted messages form a concatenated string. The one encrypted true message is positioned randomly within the string of encrypted decoy messages, i.e., placed in a random position so that it is adjacent to one or more encrypted decoy messages. The ciphertext can include a single bit pattern that can be decrypted by a true key to deliver a true message and can also be decrypted by one or more decoy keys that deliver decoy messages. In some embodiments, the lengths of each of the encrypted messages can also be included in the ciphertext message. In one example having one decoy message, one possible ciphertext message C can be provided as follows:

$$C=(\text{len}(C_t)\|\text{len}(C_d)\|C_t\|C_d) \tag{1}$$

where $C_t$ is the encrypted true message, $C_d$ is the encrypted decoy message, $\text{len}(C_t)$ is the length of the encrypted true message, and $\text{len}(C_d)$ is the length of the encrypted decoy message. The lengths can allow a decryption process to find a particular message among the concatenated string; for example, this can be useful in embodiments using encrypted messages of different lengths. In other embodiments, the lengths need not be included in the ciphertext message, e.g., if predetermined lengths are understood as part of the message protocol.

In the above example, the true message $C_t$ is positioned randomly in the ciphertext message relative to the decoy message $C_d$, such as randomly before or after the encrypted decoy message. In other embodiments, the encrypted messages can be combined in other ways. For example, portions of the encrypted true message can be intermingled with one or more encrypted decoy messages within the ciphertext message. The encrypted true message, or portions thereof, can be intermingled with or positioned randomly amongst (e.g., before, after, or between) any of the encrypted decoy messages or portions thereof. In one example, a portion of the encrypted true message is followed by a portion of an encrypted decoy message, followed by a portion of the encrypted true message or a portion of a different encrypted decoy message, etc.

In some embodiments, the ciphertext message can be arranged in blocks of data, where each block can include a portion of the encrypted true message and a portion of an encrypted decoy message. In one example using intermingled blocks, one block of data is sent to a recipient to decrypt with the true key, followed by sending a next block of data to decrypt with a decoy key, then a third block decryptable with the true key, a fourth block decryptable with the decoy key, etc. In some embodiments, any predetermined pattern or order of blocks can be provided in the ciphertext message, which can allow less obvious power signatures to be monitored by an adversary. Block-by-block processing can also simplify the processing in some embodiments, rather than encrypting or decrypting all of one multi-block message and then all of another multi-block message. In one example including at least one length value in the ciphertext message, if the message is sent block-by-block, the lengths can be the block size.

In some embodiments, the order of the encrypted true message (or portions thereof) and the encrypted decoy message (or portions thereof) within the ciphertext message may be dynamically determined rather than predetermined. For example, information can be provided at the end of each block of data in the ciphertext message, the information indicating which block in the ciphertext message should be decrypted after the current block. As each block is decrypted in the decryption process, this information can direct the decryption to a specified next block. Thus, the order of decryption of blocks, portions, or entire messages can be different for each ciphertext message, e.g., determined at the time of ciphertext creation. In some embodiments, the order of portions, blocks, or messages can be dependent on the recipient or receiver that receives the ciphertext message and desires to decrypt the message, or known as part of a transmission or initialization protocol.

In step 210, a true message indicator is created or otherwise enabled to allow a decryption process to select the true message from the other messages in the ciphertext. In some embodiments, the true message indicator can be provided or made accessible secretly to authorized recipients so as to allow only these recipients to find and decrypt the true message within the ciphertext message.

In some embodiments, the true message indicator is a designated field within or concatenated with the true decryption key, and is provided with the true key. For example, a "complete" true key can be the true key $K_t$ concatenated with the true message indicator, which can be one or more bits sufficient to indicate the position of the encrypted true message within the ciphertext message. In one example for the embodiment of equation (1) above, the complete true key can be $(K_t||0)$, where the true message indicator is a "0" bit that indicates that the encrypted true message is at a particular position in the ciphertext message (in this example, first in the ciphertext message), the position having been determined randomly. In this example, a "1" bit can indicate that the true message is located in the other position (second, after the decoy message). Additional bits can be used to indicate a true message position among multiple decoy messages. In some embodiments, the true message indicator is the parity of the key. In some other embodiments, the true message indicator is the remainder when the key is divided by some number N.

In other embodiments, the true message indicator is not formed and provided with the true key, but instead is enabled by designating the indicator to include at least one characteristic embedded in the ciphertext itself. For example, the true message indicator can include at least one characteristic of the true message. The true message indicator also includes authentic information known by the recipient, which is the desired match to the embedded characteristic of the true message. The authentic information (also referred to herein as a "password") is used for comparisons to processed messages. In some embodiments, the authentic information can be made accessible or transmitted to intended recipients, e.g., in the true key. The recipient also knows (or has access to) a predetermined method used to process the messages for the embedded characteristic, compare the embedded characteristic to the authorized information to the authentic information, and determine if each encrypted message is the true message. During decryption, encrypted messages or decrypted plaintext messages (or one or more portions thereof) can each be processed according to the predetermined method to obtain the embedded characteristic, and if the characteristic matches the password known by the recipient, that message is the true encrypted message. The known password can be provided to the recipient securely and secretly, and in some embodiments included with a true key, or separately.

In one example, the predetermined method is a hash method, and the result of applying the encrypted or plaintext message to the hash method is the embedded characteristic that is compared to the known password. If there is a match, then the message is the true message, or is a decoy message otherwise. In another example, the predetermined method can be an integrity check, such as a checksum, parity check, cyclic redundancy check (CRC), etc. The result of an integrity check on the message is the embedded characteristic that is compared to the known password and this comparison indicates its status as true or decoy. For example, the known password can be a parity of 1, such that if a message is determined to have a parity of 1, it is the true message, and is otherwise a decoy message. Some embodiments can use one or more message authentication codes (MACS) to allow both protection of message integrity and verification of authenticity. For example, in some embodiments, the predetermined method is a MAC processing method, computed on at least part of each message separately, so there is a separate MAC result value for the true message and each decoy message. The computed MAC result values from the messages are compared to the expected password value (which itself can be a MAC).

In another example, a known password and other authorized predetermined processing information can be embedded in the executable code of a processing system or programmable device such as an FPGA. One action of the device can be checking the messages against a password specific to the device, such as a different unique identifier burnt in at manufacture of each device. If there is a match to the identifier, then it is a true message.

In some embodiments that process the ciphertext message in blocks, the true message indicator can be embedded as a characteristic of the block decryption. For example, the position of the true message can be indicated based on the decryption of a particular block, such as the last bit(s) of the decrypted block indicating the position of the true message amongst the encrypted messages of the ciphertext message.

In step 212, access is allowed to the ciphertext message, true key and decoy key(s), and the true message indicator by one or more recipients, such as by storing the information on an accessible storage device or transmitting the information to the recipient(s), where the keys and true message indicator can be made secret. The process is then complete at 214.

Figure 4:
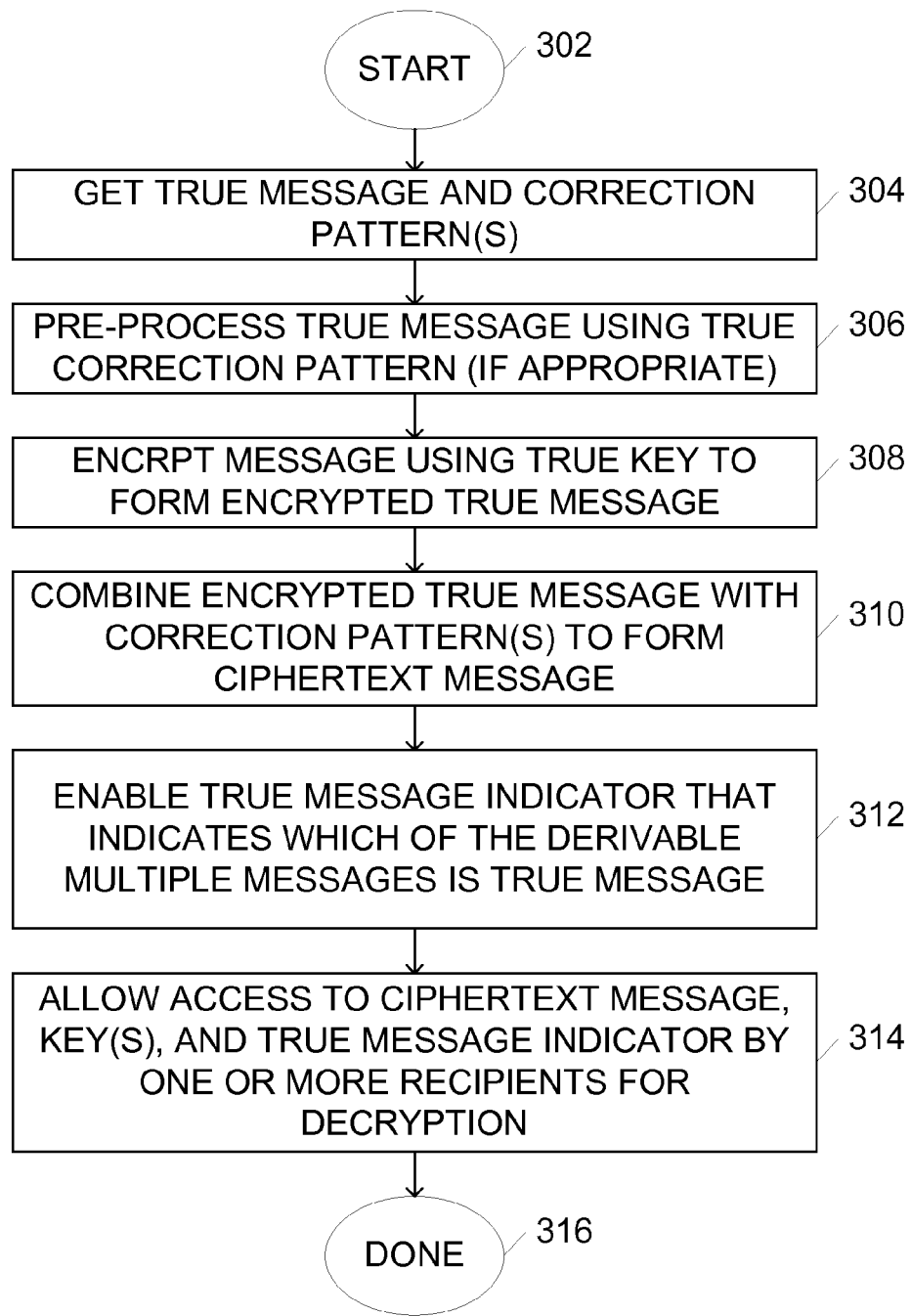
FIG. 4 is a flow diagram illustrating a second example embodiment of the method of FIG. 2, in which one or more correction patterns are included in the encrypted information.

FIG. 4 is a flow diagram illustrating a second example embodiment 300 of a method for providing encrypted information that includes multiple validly decryptable messages, and in which one or more correction patterns are included in the encrypted information. Method 300 describes particular embodiments of the method 100 of FIG. 2.

The method begins at 302, and in step 304, the true message and correction pattern(s) are obtained. A correction pattern is a form of decoy information that is a pattern of information, such that during the decryption process, an operation is performed between message information and the correction pattern, such that a true or decoy message is produced as determined by a true message indicator. For example, in some embodiments each correction pattern can be a bit string the same length as the encrypted true message. In other embodiments, a correction pattern can be other lengths of bits or other information. The operation between message information and correction pattern can be a predetermined operation, such as an XOR operation or other logical operation. Some embodiments can use one correction pattern, while others can use multiple correction patterns.

In step 306, pre-processing of the true message is performed using one of the correction patterns, which is referred to as a true correction pattern. The pre-processing processes the true message to form a patterned true message, so that the true message will be produced when the operation between the true correction pattern and the patterned true message is performed during decryption. In some cases, the encryption process determines (e.g., randomly) that the true message is not to be pre-processed with a correction pattern, and then step 306 is not performed.

In step 308, the message resulting from step 306 is encrypted using a true key to form an encrypted true message. The true key is required to validly decrypt the encrypted true message to gain access to the true message. The encryption method used can be any suitable method as described with reference to FIG. 2. The message encrypted in step 308 can be the patterned true message that was pre-processed with the true correction pattern in step 306; or in some cases the true message itself is encrypted, as explained below.

In step 310, the encrypted true message is combined with one or more of the correction patterns to form a ciphertext message, including the true correction pattern. In some embodiments, the true correction pattern is the only correction pattern included in the ciphertext message. During decryption, the encrypted true message is decrypted to provide plaintext message information. This decrypted message information can be the true message or can be the patterned true message, as determined in step 306 (e.g., randomly). The operation (during decryption) between the message information and the correction pattern thus produces either the true message (if the message information is the patterned true message) or a decoy message (if the message information is not patterned). If the encryption method has determined that the operation should produce the true message, in step 306 the true message is pre-processed such that this will occur during later decryption, and then the processed message is encrypted for inclusion in the ciphertext message. If the encryption method has determined that the operation should produce a decoy message, then in step 306 the true message is encrypted without pre-processing.

In other embodiments, multiple correction patterns can be provided in the ciphertext message. In some of these embodiments, the true message is always pre-processed such that the patterned true message is encrypted and included in the ciphertext message. Only one of the correction patterns (the true correction pattern) produces the true message in the operation during decryption between the message information and the correction pattern. The other correction patterns are decoy correction patterns that each produce a decoy message in the operation during decryption. In some embodiments, the true message can be pre-processed in step 306 such that the true message is produced by a combination of operations using multiple correction patterns (or portions thereof), the multiple patterns being a subset of a larger set of correction patterns included in the ciphertext message.

The encrypted true message and the one or more correction patterns are combined in the ciphertext message using a particular predetermined method. For example, in one embodiment, the true message is concatenated with the correction pattern(s) such that the true message and correction patterns form a concatenated string. The order of true message and correction pattern in the ciphertext message can be any predetermined order, for example, that is also known by intended recipients, or an order that is specified in the ciphertext message. In some embodiments, the true correction pattern is randomly positioned in the ciphertext message. Portions or blocks of the message and correction patterns can also be provided similarly as in the method of FIG. 3, e.g., separated from or intermingled with one another and with the ciphertext. In some embodiments, the lengths of each of the encrypted messages can also be included in the ciphertext message to allow a decryption process to find a particular message or correction pattern within the concatenated string. In other embodiments, the lengths need not be included in the ciphertext message, e.g., if predetermined lengths are understood as part of the message protocol.

In step 312, a true message indicator is formed or otherwise enabled to allow a decryption process to determine the true message from the multiple decrypted messages. In some embodiments, the true message indicator can be provided or made accessible secretly to authorized recipients so as to allow only these recipients to select the true message during decryption. For example, the true message indicator can be provided with the true key, e.g., similarly as described above for the method of FIG. 3. In other embodiments, the true message indicator can be embedded as a characteristic of the true message and recipient-known password, similarly as described above for the method of FIG. 3.

In some embodiments of method 300, the true message indicator indicates to the decryption process whether or not to perform an operation on the decrypted message information with a correction pattern to produce the true message. For example, during decryption, the message information is decrypted using a true key. If the true message indicator indicates that the operation should be performed, then this message information is the patterned true message, effectively a decoy message, and the operation between the message information and the correction pattern produces the true message. If the true message indicator indicates that no operation is to be performed, this decrypted message information is the true message and the result of the correction pattern operation is a decoy message.

In other embodiments, such as some embodiments providing multiple correction patterns in the ciphertext message, the true message indicator can indicate a position of the true correction pattern(s) in the ciphertext message among one or more decoy correction patterns, where the true correction pattern(s) produce the true message. In some embodiments, the true message indicator can include an indication as to the order of multiple correction patterns which are to be used in decrypting the true message. The true message indicator may be embedded or implicit in the true key so that decryption using the true key yields the true message, whereas decryption using a decoy key yields a decoy message.

In step 314, access is allowed to the ciphertext message, decryption key, and the message indicator by one or more recipients, such as by storing the information on an accessible storage device or transmitting the information to the recipient(s), where the key and true message indicator can be made secret. The process is then complete at 316.

The true message and the decoy message(s) can be made similar in some embodiments to allow for greater efficiencies. In one example embodiment, for identical portions or bits of the true message and decoy message(s), the correction pattern can have 0 bits in those identical bit positions such that an XOR operation with the correction pattern does not change those message bit positions. This has a benefit in embodiments which can compress the correction pattern for efficiency in storage and/or transmission, since the zeroes of the correction pattern compress efficiently.

Use of one or more correction patterns instead of providing decoy messages in the ciphertext message can have advantages in some embodiments. Smaller-sized correction patterns allow a single message to decrypt to multiple different valid messages without having to include full-sized multiple decoy messages in the ciphertext message. Furthermore, correction patterns allow decryption to multiple valid messages without the use a different key for each decrypted message. Decoy correction patterns can each provide a decoy message that is legitimate and valid and appears to be true to an adversary, e.g., decoy configuration data that produces a functioning configuration.

Figure 5:
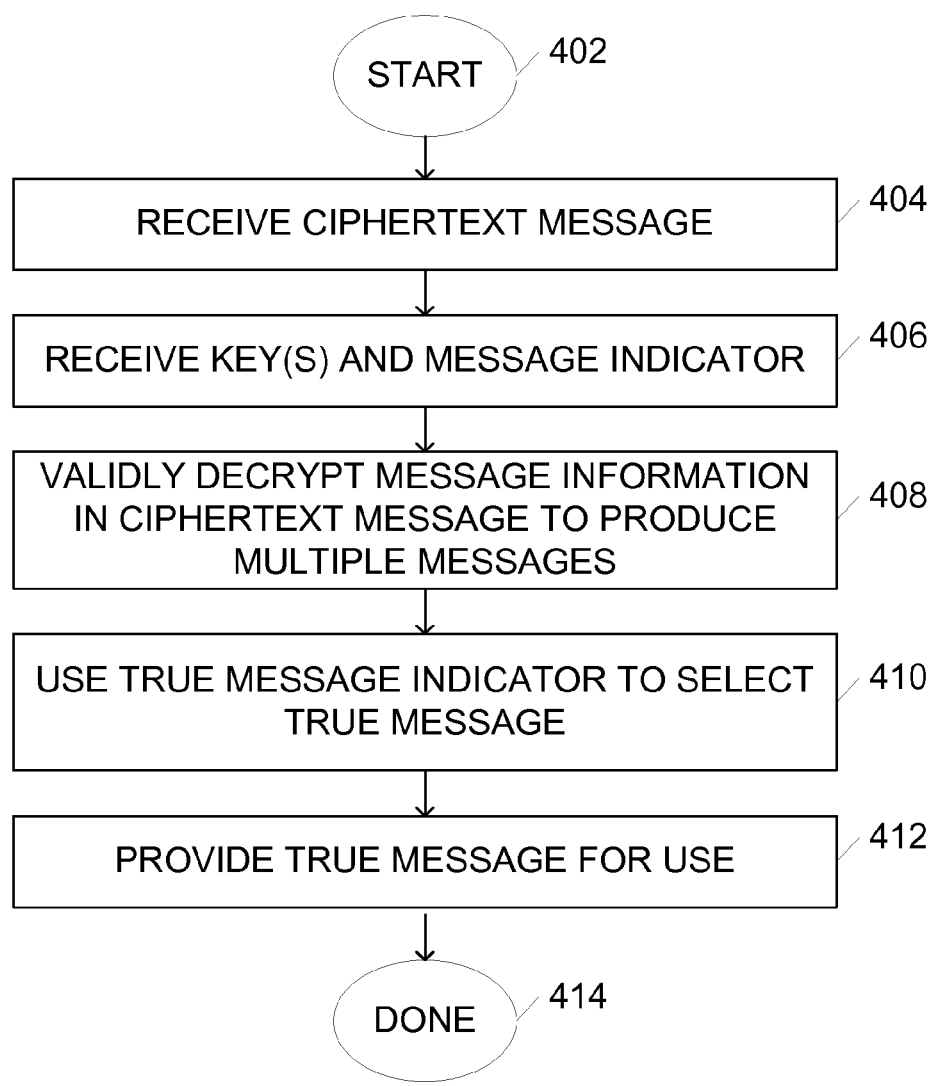
FIG. 5 is a flow diagram illustrating an embodiment of a method for decrypting encrypted information that includes multiple validly decryptable messages.

FIG. 5 is a flow diagram illustrating an embodiment 400 of a method for decrypting encrypted information that includes multiple validly decryptable messages. Method 400 can be implemented using a processor or processing circuit, a computer system or electronic device, or similar device, such as the system 30 or 10 described above with reference to FIG. 1. The method 400 can be implemented in software, hardware, or a combination of both software and hardware, or on a computer readable medium, similarly as described above for the method 100 of FIG. 2.

The method starts at 402, and in step 404, a ciphertext message encrypted using one of the methods described above is received by a recipient for decrypting to gain access to the true message included in the ciphertext message. In step 406, the recipient receives (or has access to) one or more keys which are suitable for decrypting one or more messages included in the ciphertext message, and also receives (or has access to) a true message indicator for selecting the true message from multiple decrypted messages resulting from the ciphertext message decryption. In some embodiments as described above, the true key can include the true message indicator, and/or each key can include a message identifier to identify which message is to be decrypted with that key. The ciphertext message, key(s), and/or message indicator can be received at different times, in different orders, and/or by different channels or mechanisms. For example, the ciphertext message can be received from an unprotected, unauthorized, and/or public source, since it is encrypted. The recipient in steps 404 and 406 can be a computer system, electronic device, or similar device, such as the system 30 described above with reference to FIG. 1.

In this example embodiment, the recipient is assumed to be (or is being used by) an intended (authorized) recipient that the source of the message desires to have access to the true message, such that the recipient legitimately gained access to the true key and true message indicator that can be used to decrypt information in the ciphertext message to obtain the true message. The recipient system can implement any of known authentication systems to verify the authenticity of the ciphertext message, keys, true message indicator, user, and/or other information used in the decryption process. For example, a hash function can be computed over the ciphertext message for authentication. The true key and true message indicator can be received as secret information known only to the sender and recipient, and may be authenticated as originating from a known source. In some embodiments, one or more decoy keys can also be received by an intended recipient to decrypt decoy messages. Such decoy keys can be provided in secret in some embodiments, to provide misdirection to adversaries.

In step 408, message information in the ciphertext message is validly decrypted and multiple messages may be produced. The multiple messages are produced in different ways depending on the embodiment used, as described above in various embodiments. The decryption is "valid" in the sense that it uses a legitimate key for the encrypted information and resulting decrypted information is legitimately obtained using the decryption algorithm and key. In some embodiments, only the true message is decrypted by the intended recipient, and decoy messages are decrypted (if at all) by adversaries who, for example, make incorrect guesses about which message is the true message. A transmission with a large number of decoy messages may make the probability of a correct guess sufficiently low. In some embodiments, the true key and the decoy keys are used to decrypt all the messages, and the true message is extracted from this larger amount of decrypted data. This latter embodiment may hide from an adversary the parts of the ciphertext that correspond to separate keys. In some embodiments of decryption, only the true message is decrypted. In some other embodiments of decryption, one or more decoy messages are decrypted along with the true message.

In some embodiments, described above with reference to FIG. 3, multiple encrypted messages are included and combined in the ciphertext message, and the multiple messages are produced by decrypting each of the included messages using a different associated key. A true key is used to decrypt the true message and a different decoy key is used to decrypt each decoy message (or one decoy key can decrypt multiple decoy messages in some embodiments). In some embodiments, an indicator or identifier can be included in a key and/or in the message associated with that key, so that the process knows which key to use to decrypt a particular message. For example, an identifier in a key can identify a position in the ciphertext message at which the associated message is located. In other embodiments, the keys can be used in a predetermined order, where the sender of the ciphertext message places the messages in the predetermined order in the ciphertext message such that the receiver can decrypt using the same order of keys. The encrypted messages can be decrypted in the order they are positioned in the ciphertext message, in the order of received keys, or in a dynamic or variable order based on protocol or other criteria.

In other embodiments, as described above with reference to FIG. 4, one encrypted message and one or more correction patterns are included in the ciphertext message. The process decrypts the encrypted message in the ciphertext message using a received (true) key, and then processes the decrypted message information by performing an operation on (or otherwise processing) the message with each of the correction patterns, to produce the multiple valid messages.

In step 410, a true message indicator associated with the ciphertext message is used to select the true message from the multiple messages validly obtained from the ciphertext message. An intended recipient of the true message receives or knows the true message indicator which indicates which of the multiple produced messages is the true message.

In some embodiments, the true message indicator is included in the true key, e.g., as a field or concatenated information, which can be used to determine which encrypted message in the ciphertext message (and therefore which decrypted message) is the true message. Alternatively, the true message indicator can be received separately from the true key and the ciphertext message. As described above, the true message indicator can indicate a position of the true message in the ciphertext message, for example. In other embodiments, the true message indicator includes an embedded characteristic of the messages and a password known to the decryption process, such that the obtained messages can be processed for the characteristic to find a match to the password that indicates the true message. In still other embodiments as described for FIG. 4, the true message indicator can be received with the true key (or separately) and indicates whether or not to process decrypted message information resulting from the ciphertext message with a correction pattern included in the ciphertext message. In other embodiments, the true message indicator indicates which of multiple such correction patterns produces the true message in response to the decrypted message information being processed with the patterns.

In step 412, the true message that was selected using the message indicator in step 410 is considered the decryption result for use as decrypted data, and is provided for access by one or more recipients. This is a plaintext true message for use by the recipient. For example, the processor 12 or 32 may use the true message in a local process, or provide (e.g., transmit or store) the true message for access by another processor or system. In one embodiment using a programmable device such an FPGA, the true message can include configuration data to be used to program the device. The process is then complete at step 414.

One or more embodiments described above can be implemented using symmetric methods and keys, where the key used for encryption of a particular message is the same used for decryption of that message. In other embodiments, asymmetric methods can be used, where the key used for encryption is different than the key used for decryption. For example, the encryption key can be public and the decryption key can be private and secret, as implemented in public-key cryptography. The decryption key can include a true message indicator in appropriate embodiments.

The embodiments herein can reduce the vulnerability of secured data to attacks by adversaries. In a side-channel attack such as a power analysis attack, an adversary can observe power consumption of a decrypting device as it decrypts a ciphertext message, and may be able to deduce a key from the power signature. When any of the embodiments described herein are used for encryption and decryption, an adversary may observe at the decrypting device decryption performed with the true key and/or decryption performed with decoy key(s), and does not know which of the decryptions to attack or which is legitimate. Thus the chances are high that a decoy message decryption is selected to be attacked by the adversary and not the true message decryption, especially if several decoy messages are decrypted from the ciphertext message. In embodiments having a true message indicator included with the true key, it is difficult for an adversary to find the true message indicator because it is infrequently used during the decryption process (e.g., it may only be used once for selecting the true message) and cannot easily be monitored.

The embodiments herein can also lead adversaries to be satisfied with finding a decoy key and decoy message by allowing them to use a determined key to legally decrypt a message that looks legitimate. If an adversary breaks and uses a key to validly decrypt a message, he or she may (usually falsely) assume that the true message has been found and may stop attacking the decryption. In addition, verifying that a stolen message (such as a programmable device design) is correct and is the desired message may take significant resources, and it may be unprofitable for an adversary to perform such verification. Even if the adversary discovers that a stolen message is a decoy message, it may be unprofitable to continue to try steal information used on the decrypting system due to the required verification process.

For example, in some programmable device embodiments, a decoy message can be an alternate version of a true message design used to program the device. In one example, the decoy false design functions correctly when used to program an FPGA, except for secret portions which have been removed which may not immediately be obvious. The decoy design can have similar I/O behavior, for example. In some cases the adversary may find out that it is a decoy message, but this can take a large amount of time depending on how subtle are the changes in the decoy message from the true message. Decoy messages can include misleading information to cause the adversary to make wrong conclusions about the true message.

In some embodiments, if an adversary attempts to input a decrypted decoy message to a system, countermeasures can be implemented against the adversary. The countermeasures can take different forms in different embodiments. In some embodiments, the decoy messages can themselves cause or enable countermeasures to be taken. For example, in one embodiment, a decoy message can cause an FPGA, ASIC, or other processor 12 in system 10 to disable itself and/or disable the system 10 of which it is a component. Any accessible sensitive information on the system can also be removed or deleted. In some embodiments, the decoy message can cause time limits to be enforced to make a device stop operating, or operate incorrectly, immediately or after a predetermined period of time. In another embodiment, after or during decoy message detection or processing, a decoy message can cause a device to alert an authority (such as security company or police), the original source, and/or the intended recipient of the true message, indicating that an attempted use of stolen information is in progress or has been performed. Furthermore, data on the system can be further secured and denied to the adversary.

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method for providing encrypted information, the method comprising:
   encrypting a true message to form an encrypted true message;
   forming, using a processor, a ciphertext message including the encrypted true message, wherein a plurality of messages are decryptable from the ciphertext message, the plurality of messages including the true message including true information and at least one decoy message including false information; and
   providing a true message indicator to be associated with the ciphertext message, the true message indicator being information indicating which of the plurality of messages is the true message;
   wherein the ciphertext message includes at least one pattern of information; and
   wherein the true message indicator indicates whether or not a result of an operation between decrypted information derived from the encrypted true message and the at least one pattern is the true message.

2. The method of claim 1 wherein each of the plurality of messages is decryptable using a different key.

3. The method of claim 1 wherein forming the ciphertext message includes using a true key in the forming of the encrypted true message, and
   further comprising forming at least one encrypted decoy message from the at least one decoy message and at least one decoy key, the at least one encrypted decoy message included in the ciphertext message,
   wherein the encrypted true message is decryptable to obtain the true message using the true key and the at least one encrypted decoy message is decryptable to obtain the at least one decoy message using the at least one decoy key.

4. The method of claim 3 wherein forming the ciphertext message includes intermingling portions of the encrypted true message and the at least one encrypted decoy message in the ciphertext message.

5. The method of claim 4 wherein the ciphertext message includes a plurality of decryptable blocks of information,
   wherein a decryptable block of the plurality of decryptable blocks of information that is decryptable with the true key is intermingled with one or more decryptable blocks of the plurality of decryptable blocks of information decryptable with the at least one decoy key.

6. The method of claim 3 wherein during decryption of the ciphertext message, the true message indicator indicates a position of the true message in the ciphertext message with respect to the encrypted true message and the at least one encrypted decoy message in the ciphertext message.

7. The method of claim 3 wherein the true message indicator is combined with the true key and provided secretly to the intended recipient with the true key.

8. The method of claim 1 wherein the true message indicator includes at least one embedded characteristic of the true message and authentic information known by the one or more intended recipients,
   such that the true message is indicated by matching the at least one embedded characteristic of one of the plurality of messages to the authentic information.

9. The method of claim 8 wherein the true message is indicated by one of:
   matching the result of a cryptographic hash performed on the true message with a known authentic result, or
   matching the result of an integrity check performed on the true message with a known authentic result.

10. The method of claim 1 wherein the ciphertext message includes a plurality of correction patterns of information,
    wherein the true message indicator indicates which of the plurality of correction patterns is to be used to operate on decrypted information derived from the encrypted true message to obtain the true message.

11. A system using the method of claim 1, the system including a storage device and the processor, the processor coupled to the storage device, the storage device for storing information including the true message.

12. A method for decrypting information, the method comprising:
    receiving a ciphertext message including encrypted information; and
    decrypting, using a processor, the encrypted information to obtain a plurality of messages from the ciphertext message, the plurality of messages including a true message including true information and at least one decoy message including false information;
    wherein the decrypting of the encrypted information to obtain the plurality of messages includes:
       decrypting the encrypted information included in the ciphertext message to obtain decrypted information; and
       using a true message indicator associated with the ciphertext message to process the decrypted information with at least one correction pattern included in the ciphertext message to derive the true message and the at least one decoy message; and
    selecting the true message from the decrypted information.

13. The method of claim 12 wherein the decrypting of the encrypted information to obtain the plurality of messages includes:
    decrypting an encrypted true message included in the ciphertext message using a true key, and
    decrypting at least one encrypted decoy message included in the ciphertext message using at least one decoy key.

14. The method of claim 12 wherein the ciphertext message includes an encrypted true message and decoy information, and wherein the selecting of the true message includes using the true message indicator associated with the ciphertext message, the true message indicator being information indicating which of the plurality of messages is the true message.

15. The method of claim 12 wherein the true message indicator indicates a position of the true message in the ciphertext message with respect to the true message and the at least one decoy message in the ciphertext message.

16. The method of claim 15 wherein the true message indicator includes at least one embedded characteristic of the true message and authentic information known by the one or more intended recipients,
    such that the true message is indicated by matching the at least one embedded characteristic of one of the plurality of messages to the authentic information.

17. A non-transitory computer-readable medium having instructions which when executed on a computer to perform a method, the method comprising:
    decrypting encrypted information to obtain a plurality of messages from a ciphertext message, the plurality of messages including a true message including true information and at least one decoy message including false information;
wherein the decrypting of the encrypted information to obtain the plurality of messages includes:
　decrypting the encrypted information included in the ciphertext message to obtain decrypted information; and
　using a true message indicator associated with the ciphertext message to process the decrypted information with at least one correction pattern included in the ciphertext message to derive the true message and the at least one decoy message; and
selecting the true message from the decrypted information.

* * * * *